(12) United States Patent  (10) Patent No.: US 9,174,502 B2
Pietschmann  (45) Date of Patent: Nov. 3, 2015

(54) VEHICLE-MOUNTED TRAILER COUPLING

(71) Applicant: Ralf Pietschmann, Loechgau (DE)

(72) Inventor: Ralf Pietschmann, Loechgau (DE)

(73) Assignee: Scambia Holdings Cyprus Limited, Limassol (CY)

( * ) Notice: Subject to any disclaimer, the term of this patent is extended or adjusted under 35 U.S.C. 154(b) by 0 days.

(21) Appl. No.: 14/161,864

(22) Filed: Jan. 23, 2014

(65) Prior Publication Data

US 2014/0210185 A1  Jul. 31, 2014

(30) Foreign Application Priority Data

Jan. 25, 2013 (DE) .................... 10 2013 100 777

(51) Int. Cl.
*B60D 1/54* (2006.01)
*B60D 1/48* (2006.01)

(52) U.S. Cl.
CPC . *B60D 1/48* (2013.01); *B60D 1/485* (2013.01)

(58) Field of Classification Search
CPC ........... B60D 1/485; B60D 1/488; B60D 1/56
USPC .............................................. 280/495, 491.3
See application file for complete search history.

(56) References Cited

U.S. PATENT DOCUMENTS

| 2,753,193 | A | | 7/1956 | Halverson | |
|---|---|---|---|---|---|
| 3,558,158 | A | * | 1/1971 | Abromavage et al. | 280/502 |
| 4,610,458 | A | * | 9/1986 | Garnham | 280/495 |
| 8,019,913 | B2 | * | 9/2011 | Johnson | 710/35 |
| 2002/0053782 | A1 | | 5/2002 | Peters | |
| 2005/0263984 | A1 | | 12/2005 | Gurtler | |
| 2006/0006626 | A1 | * | 1/2006 | Scruggs | 280/495 |
| 2011/0031718 | A1 | * | 2/2011 | Di Parma et al. | 280/504 |
| 2012/0056448 | A1 | * | 3/2012 | Takahashi | 296/203.04 |

FOREIGN PATENT DOCUMENTS

| CA | 2494032 A1 | 7/2006 |
|---|---|---|
| DE | 22 10 847 C3 | 1/1980 |
| DE | 10 2007 060 481 A1 | 6/2009 |
| DE | 202009006345 U1 | 10/2010 |
| DE | 10 2011 055 350 A1 | 5/2012 |
| EP | 1008468 A2 | 6/2000 |
| EP | 2095978 A1 | 9/2009 |
| FR | 2948065 A1 | 1/2011 |
| JP | 2008 143 461 A | 6/2008 |

* cited by examiner

*Primary Examiner* — Tony Winner
(74) *Attorney, Agent, or Firm* — Reinhart Boerner Van Deuren P.C.

(57) ABSTRACT

In order to connect a trailer coupling, in particular for motor vehicles, comprising a ball neck, a cross member, which is provided with a holding unit for the ball neck, and also two spaced attachment parts, which engage on the cross member and connect the cross member to mounting elements, which are themselves mountable on a rear part of a motor vehicle body, in such a manner that undesirable moments and/or forces are transferred to the motor vehicle body on the lowest possible scale, it is proposed that a connection between the cross member and the mounting elements is achieved only by means of the attachment parts, that the attachment parts have a cross member holding strip element connected to the cross member and that, through at least one curved strip element running to the cross member without connection, the cross member holding strip element runs to a mounting strip element, which is connected to the respective mounting element.

18 Claims, 4 Drawing Sheets

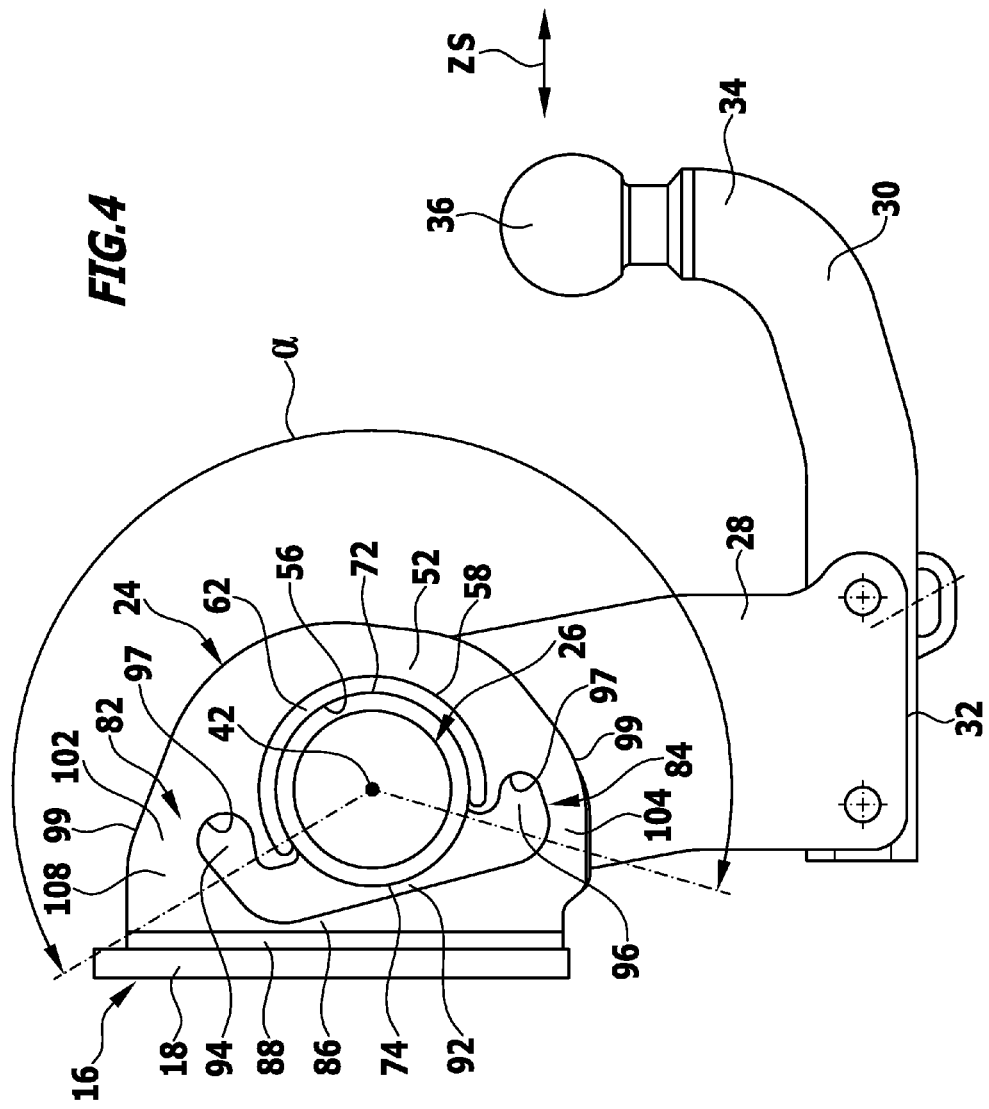

VEHICLE-MOUNTED TRAILER COUPLING

CROSS-REFERENCE TO RELATED PATENT APPLICATION

This patent application claims the benefit of German application No. 10 2013 100 777.5, filed Jan. 25, 2013, the teachings and disclosure of which are hereby incorporated in their entirety by reference thereto.

BACKGROUND OF THE INVENTION

The invention relates to a trailer coupling, in particular for automobiles, comprising a ball neck, a cross member, which is provided with a holding unit for the ball neck, and also two spaced attachment parts, which engage on the cross member and connect the cross member to mounting elements, which are themselves mountable on a rear part of a motor vehicle body.

Such trailer couplings are known from the prior art. Both pull/thrust forces, which lead to an elastic deflection of the cross member, and transverse forces, which act in the longitudinal direction of the cross member and are transferred from the cross member to the attachment parts and from the attachment parts to the mounting elements, act on the ball neck in these trailer couplings.

However, the motor vehicle body should be subjected on the lowest possible scale to bending moments generated, for example, by the deflection of the cross member and/or to transverse forces acting parallel to the longitudinal direction of the cross member, since otherwise damage ensues at the rear part of the motor vehicle body.

Therefore, the object forming the basis of the invention is to connect the cross member to the motor vehicle body in such a manner that undesirable moments and/or forces are transferred to the motor vehicle body on the lowest possible scale.

SUMMARY OF THE INVENTION

This object is achieved according to the invention with a trailer coupling of the above-described type in that a connection between the cross member and the mounting elements is achieved only by means of the attachment parts, that the attachment parts have a cross member holding strip element connected to the cross member and that, though at least one curved strip element running to the cross member without connection, the cross member holding strip element runs to a mounting strip element, which is connected to the respective mounting element.

The advantage of the solution according to the invention is that such a configuration of the attachment parts provides the possibility of elastically absorbing moments and/or forces, in particular moment peaks and/or force peaks, in the region of the attachment parts and passing these on the lowest possible scale onto the mounting elements, which are fixedly connected to the motor vehicle body.

In order to prevent in particular an application of force from the cross member into the mounting elements themselves, it is preferably provided that the attachment parts hold the cross member in position in a non-contact manner relative to the mounting elements.

Moreover, an optimally elastic behaviour can be achieved in the region of the attachment parts if the at least one curved strip element runs in a plane extending transversely to the cross member.

Moreover, it is also advantageous if the cross member holding strip element runs at least with a part-region in a plane extending transversely to the cross member, since in this case the cross member holding strip element can then be connected in a simple manner to the at least one curved strip element.

In this case, the cross member holding strip element could have fastening lugs, which run transversely to the plane and are connected to the cross member.

However, the cross member holding strip element can also be connected to the cross member at a narrow side or an edge region.

Moreover, it is also advantageous if the mounting strip element runs with at least one part-region in a plane extending transversely to the cross member, so that a simple connection is also obtainable between the at least one curved strip element and the mounting strip element.

In this case, the mounting strip element can be provided with a part-region running transversely to the plane and connected to the mounting element.

A particularly inexpensive configuration of the attachment parts is possible when the cross member holding strip element, the at least one curved strip element and the mounting strip element form a part in one piece.

No further details have been given so far with respect to the connection between the cross member holding strip element and the cross member.

Thus, it would be conceivable, for example, to screw the cross member holding strip element to the cross member.

It would be conceivable, for example, to provide the cross member holding strip element with brackets, which can be placed on the cross member and screwed thereto.

However, a particularly inexpensive and stable connection can be obtained between the cross member holding strip element and the cross member if the cross member holding strip element is welded to the cross member.

Moreover, it would likewise be conceivable to also screw the mounting strip element to the mounting element.

However, it is also advantageous here with respect to simplicity and stability of production if the mounting strip element is welded to the mounting element.

To create a connection between the cross member holding strip element and the cross member that is as long-lasting as possible and withstands alternating stresses, it is preferably provided that the cross member holding strip element engages on a peripheral face of the cross member and can thus be connected stably and permanently to the cross member.

It is preferably provided that the cross member extends on both sides of the cross member holding strip element, so that the connection between the cross member holding strip element and the cross member does not occur by means of an end face of the cross member, but only by means of the peripheral face.

Moreover, it is of great advantage for the elasticity of the behaviour of the attachment parts if the cross member holding strip element engages on a peripheral region of the cross member which lies outside a peripheral region directed towards the respective mounting element.

It is therefore possible in particular to provide as large a length as possible of the curved strip elements that is advantageous for the elastic behaviour without significantly increasing the structural space for the attachment parts.

In particular, it is provided that the cross member holding strip element engages on the cross member at a peripheral region of the cross member remote from the mounting element and is connected to this peripheral region of the cross member.

No further details have likewise be given with respect to the further configuration of the curved strip elements.

Thus, it is preferably provided that spanning the cross member in a non-contact manner the at least one curved strip element runs from the cross member holding strip element to the mounting strip element, so that there is likewise the possibility of providing as large a curve length as possible.

A further advantageous solution provides that the at least one curved strip element engages over the cross member on a side facing away from a road surface.

Another advantageous solution provides that the at least one curved strip element engages over the cross member on a side facing towards a road surface.

A particularly advantageous solution provides that the attachment parts have two curved strip elements, wherein a first curved strip element engages over the cross member on its side facing away from the road surface and a second curved strip element engages over the cross member on its side facing towards the road surface.

Moreover, an expedient solution provides that the ends of the curved strip elements directed towards the mounting element are connected to one another by the mounting strip element, so that the two curved strip elements with the mounting strip element and the cross member holding strip element allow a flow of force running on both sides around the cross member from the cross member holding strip element to the mounting element.

Moreover, it is preferably provided that between the cross member holding strip element and the mounting strip element the at least one curved strip element has at least one elastic region, the bending elasticity of which is greater in a longitudinal direction of the cross member than the bending elasticity in the region of the cross member holding strip element or the mounting strip element.

With respect to the configuration of the at least one curved strip element it is favourable if this is formed free from welds at least in its elastic region in order to prevent a weakening of the material structure in the region of the curved strip element.

Moreover, it is favourable if at least in its elastic region the curved strip element has boundary contours, the radii of which are larger than 10 mm, better larger than 15 mm and even better larger than 20 mm, so that no reduction in material is obtained by a notch effect.

Further features and advantages are the subject of the following description and also the representation of some exemplary embodiments in the drawing.

BRIEF DESCRIPTION OF THE DRAWINGS

FIG. 4 is an enlarged representation of a side view in the direction of the arrow B in FIG. 2 of the trailer coupling according to the invention with an attachment part shown in plan view.

DETAILED DESCRIPTION OF THE INVENTION

Figure 1:
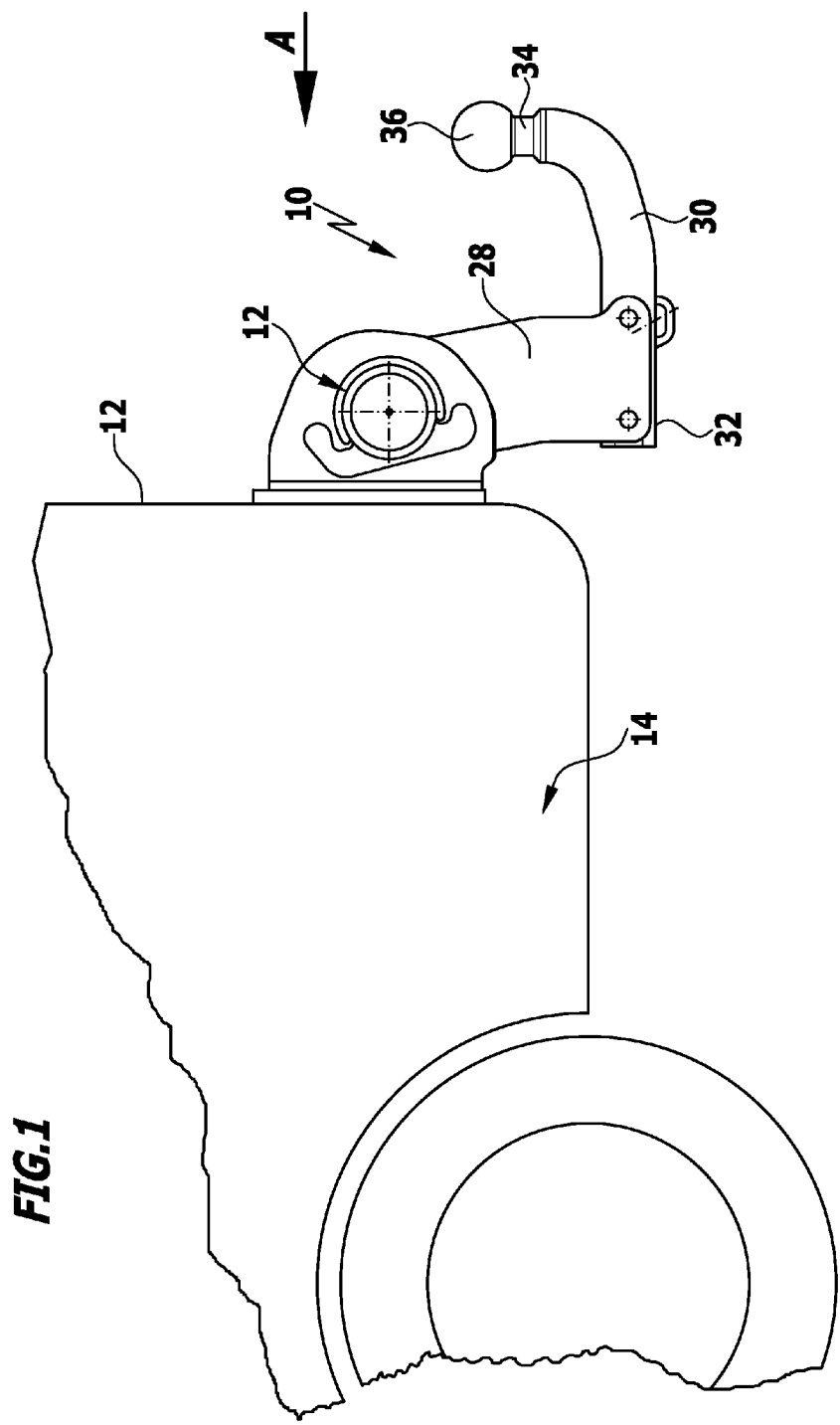
FIG. 1 is a side view of a motor vehicle with a trailer coupling according to the invention.
Figure 2:
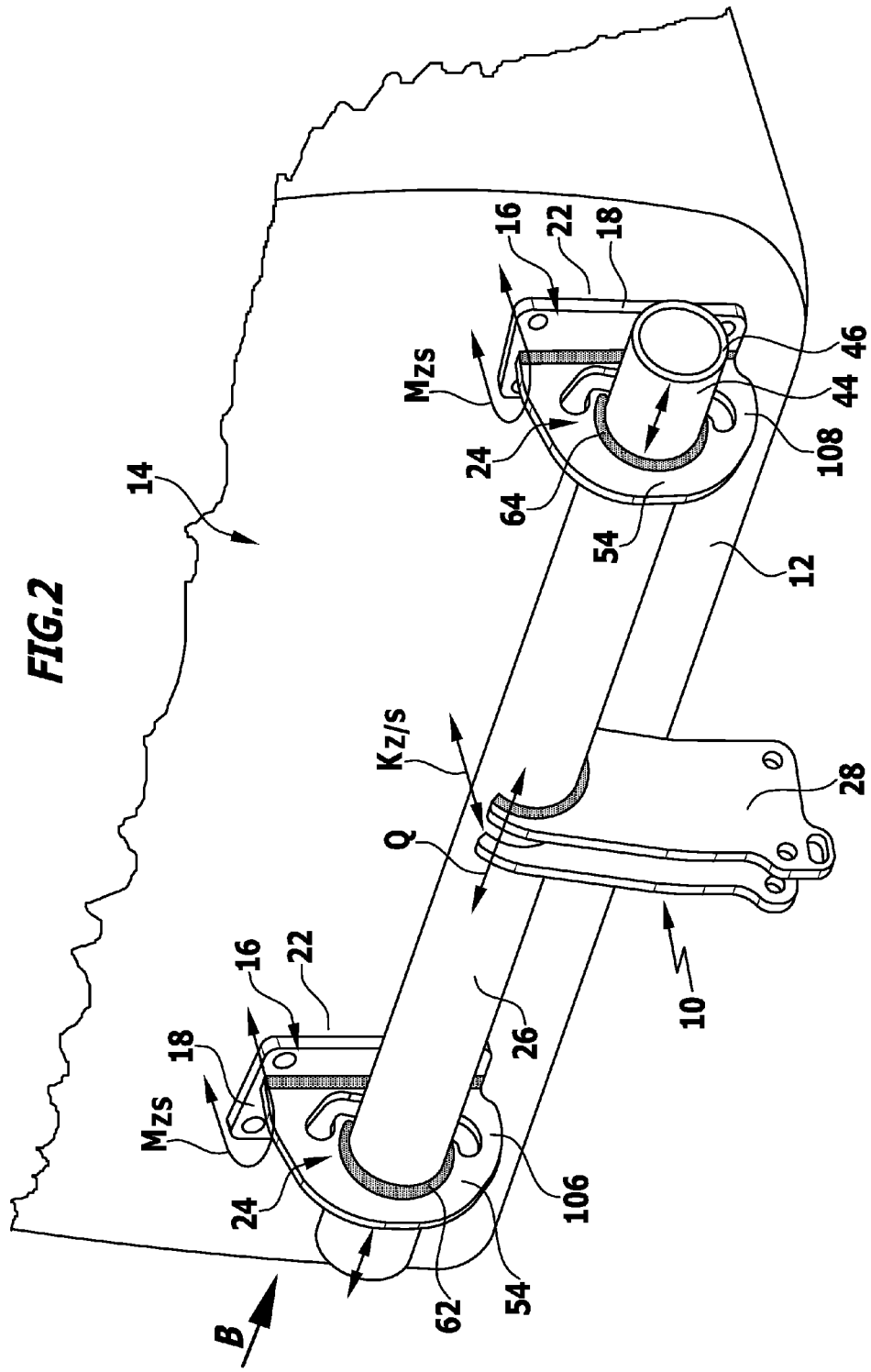
FIG. 2 is a perspective representation of the trailer coupling according to the invention mounted on a rear part of a motor vehicle body.

An exemplary embodiment of a trailer coupling 10 according to the invention shown in FIGS. 1 and 2 is mountable on a rear part 12 of a motor vehicle body given the overall reference 14, in particular a motor vehicle body of an automobile, wherein for this the trailer coupling 10 has mounting elements 16, which in the shown exemplary embodiment are configured as flange plates 18, which are mountable on correspondingly reinforced mounting areas 22 of the rear part 12 by means of screws, for example.

However, instead of the flange plates 18 it would also be conceivable to provide mounting elements 16 configured as longitudinal brackets, which are mountable on body parts of the motor vehicle body 14 running in the longitudinal direction.

Attachment parts given the overall reference 24, which connect a cross member 26 to the mounting elements 16, engage on the mounting elements 16.

Provided in turn on the cross member 26 is a holding unit given the overall reference 28, which carries a ball neck given the overall reference 30, which is connected to the holding unit 28 at a first end 32 and carries a coupling ball given the overall reference 36 at a second end 34.

In this case, the holding unit 28 can be a rigidly configured holding unit for the ball neck 30.

However, it is also conceivable to configure the holding unit 28 as a pivotal unit, with which the ball neck 30 is held to pivot on the cross member 26.

In its operating disposition, the ball neck 30 extends symmetrically to a longitudinal centre plane 40 of the trailer coupling 10 and also the motor vehicle body 14, so that the coupling ball 36 is also arranged symmetrically to the longitudinal centre plane 40, whereas the cross member 26 extends with its longitudinal axis 42 transversely, preferably perpendicularly, to the longitudinal centre plane 40.

In the illustrated exemplary embodiment of the trailer coupling according to the invention, the cross member 26 additionally extends from the holding unit 28 in the direction of the attachment parts 24 and also respectively beyond the attachment parts 24, so that outer ends 44 of the cross member 26 project behind the attachment parts 24 on a side remote from the holding unit 28 or at least pass through the attachment parts 24 to such an extent that the attachment parts 24 do not engage on end faces 46 at the outer ends 44, but engage on the cross member 26 at a distance from the respective end faces 46 of the cross member 26.

Figure 3:
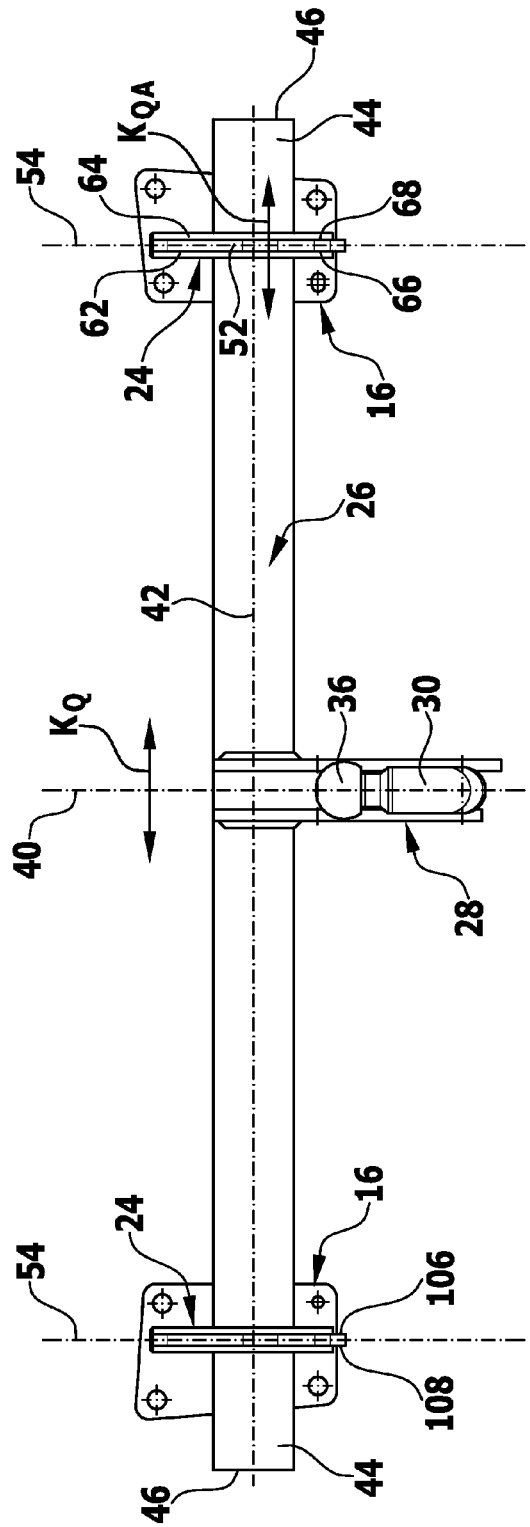
FIG. 3 is a view of the trailer coupling according to the invention in the direction of the arrow A in FIG. 1.

As FIG. 4 shows in an enlarged representation, each of the two attachment parts 24 comprises a cross member holding strip element 52, which as shown in FIG. 3 extends in a surface 54 running transversely to the longitudinal axis 42 of the cross member 26, wherein in the simplest case the surface 54 is configured as a plane and, for example, runs parallel or at an acute angle of less than 45° in particular to the longitudinal centre plane 40.

In this case, the cross member holding strip element 52 is formed as a plate, for example, and with a contact edge 56 abuts against a peripheral face 58 of the cross member 26, wherein abutting against the peripheral face 58 of the cross member 26 the contact edge 56 extends over a spanning angle a, for example, wherein the spanning angle a is to be measured as an angle running around the longitudinal axis 42.

The spanning angle a preferably amounts to more than 90°, even better more than 180°, preferably less than 270°, even better less than 230°.

In this case, the connection between the cross member holding strip element 52 and the cross member 26 is achieved by means of welds 62, 64 (FIGS. 2 and 3) running on both sides of the cross member holding strip element 52, which are continuously running welds, for example, which run along a groove located between the peripheral face 58 and side faces 66, 68 of the cross member holding strip element 52.

However, it is alternatively also conceivable not to support the cross member 26 by a contact edge 56 of the cross member holding strip element 52 continuously abutting against the peripheral face 58, but to support it by individual support edges formed by the cross member holding strip element 52 and extending over the desired spanning angle a in consecutive angle part segments, and also to additionally provide welds 62 and 64 in the region of the support edges, so that the connection between the cross member holding strip element 52 and the cross member 26 is achieved by non-contiguous and interrupted welds 62, 64.

As shown in particular in FIG. 4, the cross member holding strip element 52 does not engage in a region of the peripheral face 58 of the cross member 26 facing towards the respective mounting elements 16, but at a peripheral region 72, which lies outside a peripheral region 74 facing towards the respective mounting element 16.

In the case of the attachment parts 24 according to the invention the cross member holding strip element 52 is connected to a mounting strip element 86 by means of an upper curved strip element 82 and a lower curved strip element 84, wherein the mounting strip element 86 is connected to the mounting elements 16, e.g. to the flange plates 18, by a weld connection 88.

In this case, the mounting strip element 86, which extends between the mounting element 17, in particular its flange plate 18, and the cross member 26, runs in a non-contact manner relative to the cross member 26, so that there remains a free space 92 between the mounting strip element 86 and the cross member 26.

In the same manner, the curved strip elements 82 and 84 run in a non-contact manner relative to the cross member 26 and surround on both sides the curved free spaces 94 and 96, which adjoin the free space 92 and are delimited by the curved strip elements 82 and 84 and which extend as far as the cross member holding strip element 52.

The curved strip elements 82, 84 are preferably configured so that their boundary edges 97, 99 directed towards or away from the curved free spaces 94, 96 have contours, the radii of which are not larger than 10 mm, better larger than 15 mm and even better larger than 20 mm, in order to prevent a notch effect with too small radii or and even corners.

In the attachment parts 24 according to the invention, both the mounting strip element 86 and the two curved strip elements 82 and 84 preferably extend in the surface 54, in which the cross member holding strip element 52 also extends, and which runs transversely to the longitudinal axis 42 of the cross member 26, preferably perpendicularly to the longitudinal axis 42 of the cross member 26.

To prevent material regions?, preferably no weld is provided in the region of the curved strip elements to prevent a weakening of the material structure.

The mounting strip element 86 and the curved strip elements 82 and 84 as well as the cross member holding strip element 52 are preferably produced as a part in one piece, preferably cut out of a part in the form of a plate.

In the case of the attachment parts 24 according to the invention the forces, e.g. pull/thrust forces $K_{ZS}$ or transverse forces $K_Q$, acting on the coupling ball 36 during trailer operation or load carrier operation are applied to the cross member 26 by means of the ball neck 30 and the holding unit 28 and are passed by the cross member 26 by means of the attachment parts 24 to the mounting elements 16, which then apply these forces to the rear part 12 of the motor vehicle body 14.

In this case, pull/thrust forces $K_{ZS}$ acting in the direction of the longitudinal centre plane 40 lead to a deflection movement of the cross member 26, which lies in a plane spanned by the forces $K_{ZS}$ and the longitudinal direction and thus generates the bending moments $M_{ZS}$ in the region of the attachment parts 24, and the transverse forces $K_Q$ acting transversely to the longitudinal centre plane 40 respectively lead to transverse forces $K_{QA}$ acting on the attachment parts 24. These bending moments $M_{ZS}$ and transverse forces $K_{QA}$ are transferred to the mounting elements 16 at the lowest possible scale and/or in an elastically damped manner so as not to stress the rear part 12 of the motor vehicle body 14 with moment peaks and force peaks.

For this reason, the attachment parts 24 elastically absorb the bending moments $M_{ZS}$ and/or transverse forces $K_{QA}$ as far as possible and transfer these in as damped a manner as possible to the mounting elements 16.

A transfer of the bending moments $M_{ZS}$ and transverse forces $K_{QA}$ occurs to the respective cross member holding strip elements 52, which because of the weld connection to the cross member 26 absorb and pass on the transverse forces $K_{QA}$ unchanged.

However, the bending moments $M_{ZS}$ and/or transverse forces $K_{QA}$ are resiliently absorbed by the curved strip elements 82 and 84, which also extend in the surfaces 54, so that in particular an only partial and/or damped transfer of these bending moments $M_{ZS}$ and/or transverse forces $K_{QA}$ to the mounting strip element 86 occurs.

For this, it is necessary, on the one hand, to select the largest possible length of the curved strip elements 82 and 84 and, on the other hand, to provide the curved strip elements 82 and 84 with elastic regions 102 and 104, which length results by reducing a structural part cross-section of the curved strip elements 82 and 84 in the elastic regions 102 and 104, wherein the elastic regions 102 and 104 also have a sufficient stability to absorb forces acting parallel to the areas 54 with sufficiently high rigidity, which is facilitated in that the curved strip elements 82 and 84 extend in the surfaces 54 in the form of plates and thus because of their shape already have a high rigidity in the case of forces acting parallel to these areas, whereas the rigidity of the plate-like curved strip elements 81 and 84 is lower and the elasticity higher in the case of the bending moments $M_{ZS}$ and/or transverse forces $K_{QA}$, which act transversely, preferably perpendicularly, to the surfaces 54, in particular in the elastic regions 102 and 104 because of the reduced structural part cross-section and the only small material thickness of the plate-like parts available for absorption of these transverse forces QA.

In particular, the elastic regions 102 and 104 are configured free from welds and have boundary contours 97, 99, the radii of which are larger than 10 mm, better larger than 15 mm and even better larger than 20 mm.

Therefore, a curve length of the curved strip elements 82 and 84, in conjunction with the elastic regions 102 and 104 and the fact that the curved strip elements 82 and 84 extend in the form of plates with flat side 106 and 108 running parallel to the surface 54, has an elasticity-promoting effect for absorption of the bending moments $M_{ZS}$ and/or transverse forces $K_{QA}$.

The invention claimed is:

1. A trailer coupling for motor vehicles, comprising a ball neck, a cross member, which is provided with a holding unit for the ball neck, and two spaced attachment parts, which engage on the cross member and connect the cross member to mounting elements, the mounting elements mountable on a rear part of a motor vehicle body, a connection between the cross member and the mounting elements being achieved only by means of the attachment parts, the attachment parts having a cross member holding strip element connected to a partial peripheral region of the cross member outside a peripheral region facing towards the mounting element and, further having at least one curved strip element extending without connection to the cross member, and connecting the cross member holding strip element to a mounting strip element, which is connected to the respective mounting element.

2. The trailer coupling according to claim 1, wherein the attachment parts hold the cross member in position in a non-contact manner relative to the mounting elements.

3. The trailer coupling according to claim 1, wherein the at least one curved strip element runs in a plane extending transversely to the cross member.

4. The trailer coupling according to claim 1, wherein the cross member holding strip element runs at least with a part-region in a plane extending transversely to the cross member.

5. The trailer coupling according to claim 1, wherein the mounting strip element runs at least with a part-region in a plane extending transversely to the cross member.

6. The trailer coupling according to claim 1, wherein the cross member holding strip element, the at least one curved strip element and the mounting strip element form a part in one piece.

7. The trailer coupling according to claim 1, wherein the cross member holding strip element is welded to the cross member.

8. The trailer coupling according to claim 1, wherein the mounting strip element is welded to the mounting element.

9. The trailer coupling according to claim 1, wherein the cross member holding strip element engages on a peripheral face of the cross member.

10. The trailer coupling according to claim 1, wherein the cross member extends on both sides of the cross member holding strip element.

11. The trailer coupling according to claim 1, wherein engaging over the cross member in a non-contact manner the at least one curved strip element runs from the cross member holding strip element to the mounting strip element.

12. The trailer coupling according to claim 1, wherein the cross member holding strip element engages on the cross member on a peripheral region of the cross member facing away from the mounting elements and is connected to these peripheral regions of the cross member.

13. The trailer coupling according to claim 1, wherein the attachment parts have two curved strip elements, wherein a first curved strip element engages over the cross member on its side facing away from the road surface and a second curved strip element engages over the cross member on its side facing towards the road surface.

14. The trailer coupling according to claim 13, wherein the ends of the curved strip elements directed towards the mounting elements are connected to one another by the mounting strip element.

15. A trailer coupling for motor vehicles, comprising a ball neck, a cross member which is provided with a holding unit for the ball neck, and also two spaced attachment parts, which engage on the cross member and connect the cross member to mounting elements, the mounting elements mountable on a rear part of a motor vehicle body, connection between the cross member and the mounting elements being achieved only by means of the attachment parts, the attachment parts having a cross member holding strip element connected to the cross member and, at least one curved strip element running to the cross member without connection from the cross member holding strip element to a mounting strip element, which is connected to the respective mounting element, wherein the at least one curved strip element engages over the cross member on a side facing towards a road surface.

16. A trailer coupling for motor vehicles, comprising a ball neck, a cross member, which is provided with a holding unit for the ball neck, and two spaced attachment parts, which engage on the cross member and connect the cross member to mounting elements, the mounting elements mountable on a rear part of a motor vehicle body, a connection between the cross member and the mounting elements being achieved only by means of the attachment parts, and the attachment parts having a cross member holding strip element connected to the cross member and, engaging on the connected to a peripheral region of the cross member, which lies outside a peripheral region of the cross member directed towards the respective mounting element, the cross member holding strip element being connected to a mounting strip element, through at least one curved strip element extending without connection to the cross member, which mounting strip element is connected to the respective mounting element.

17. A trailer coupling, for motor vehicles, comprising a ball neck, a cross member, which is provided with a holding unit for the ball neck, and also two spaced attachment parts, which engage on the cross member and connect the cross member to mounting elements, the mounting elements mountable on a rear part of a motor vehicle body, a connection between the cross member and the mounting elements being achieved only by means of the attachment parts, the attachment parts having a cross member holding strip element connected to the cross member and, at least one curved strip element extending to the cross member without connection from the cross member holding strip element to a mounting strip element, wherein the at least one curved strip element engages over the cross member on a side facing away from a road surface.

18. A trailer coupling for motor vehicles, comprising a ball neck, a cross member, which is provided with a holding unit for the ball neck, and also two spaced attachment parts, which engage on the cross member and connect the cross member to mounting elements, the mounting elements mountable on a rear part of a motor vehicle body, a connection between the cross member and the mounting elements being achieved only by means of the attachment parts, the attachment parts having a cross member holding strip element connected to a peripheral region of the cross member and at least one curved strip element running without connection to the cross member and extending from the cross member holding strip element to a mounting strip element, the at least one curved strip element has at least one elastic region, the bending elasticity of which is greater in a longitudinal direction of the cross member than the bending elasticity in the region of the cross member holding strip element or the mounting strip element which extends in a non-contact manner relative to the cross member and which is connected to the respective mounting element.

* * * * *